Patented Aug. 6, 1935

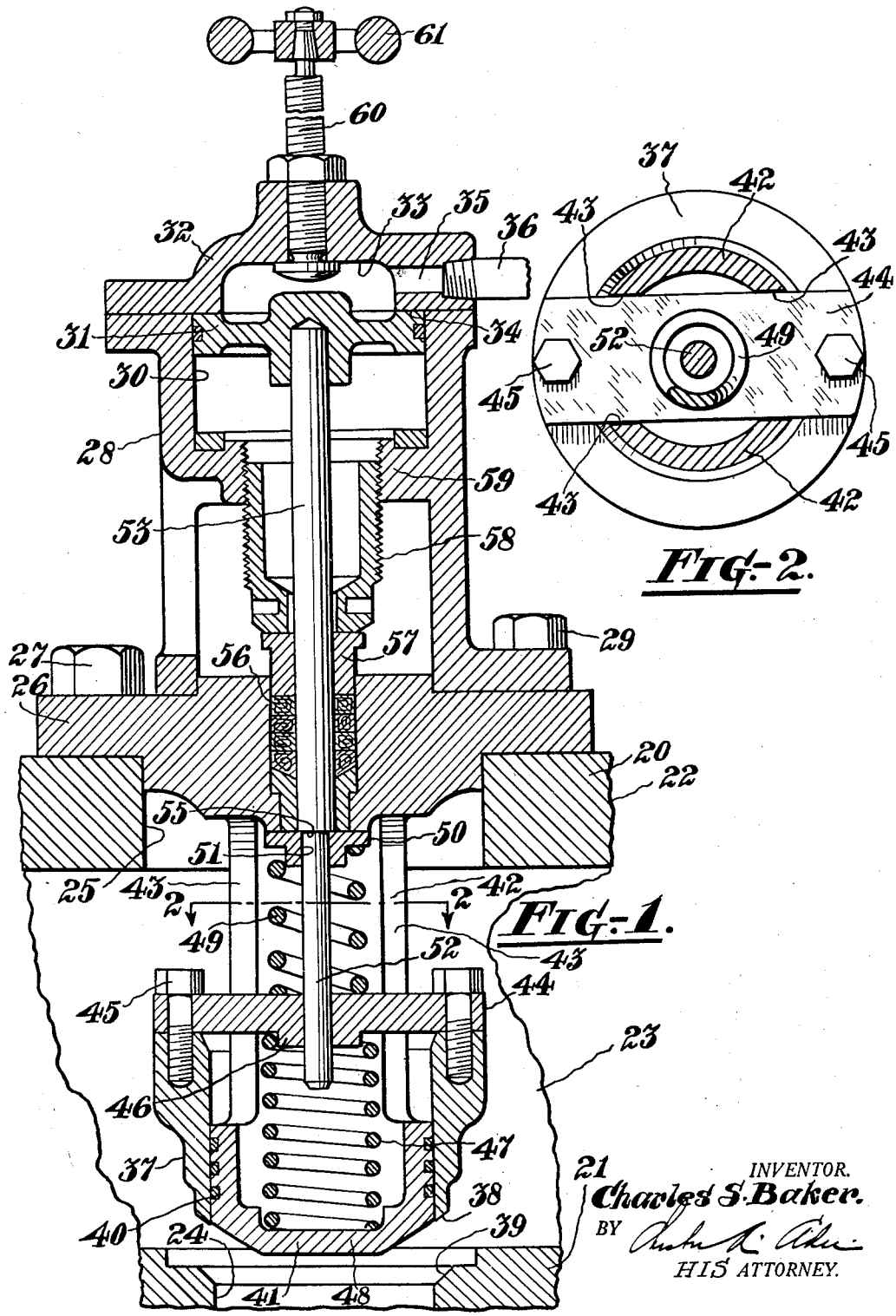

2,010,129

UNITED STATES PATENT OFFICE 2,010,129

VALVE ASSEMBLY

Charles S. Baker, Corning, N. Y., assignor to Ingersoll-Rand Company, Jersey City, N. J., a corporation of New Jersey Application September 26, 1934, Serial No. 745,520

3 Claims. (Cl. 137—139)

This invention relates to compressors, but more particularly to a valve assembly for machines of this type.

One object of the invention is to obtain an efficient valve assembly of which the valve may be readily actuated in response to the forces operating it, and another object is to prevent sharp impact of the valve against the elements which serve to limit its movement.

Other objects will be in part obvious and in part pointed out hereinafter.

In the accompanying drawing illustrating the invention and in which similar reference numerals refer to similar parts, Figure 1 is an elevation, in section, of a valve assembly constructed in accordance with the practice of the invention and showing it applied to a compressor, and Figure 2 is a transverse view taken through Figure 1 on the line 2—2.

Referring more particularly to the drawing, 20 represents so much of a compressor as will serve to illustrate a practical application of the invention, and 21 and 22 are inner and outer walls, respectively, of the compressor.

Between the walls 21 and 22 is a chamber 23, and in the inner wall is an aperture 24 through which the chamber 23 communicates with the compression chamber (not shown) of the compressor. Similarly, in the wall 22 is an aperture 25 which is arranged coaxially with the aperture 24 and is covered by a plate 26 secured to the wall 22, as by bolts 27.

As a preferred arrangement, the plate 26 serves as a seat for a cylinder 28 secured to the plate by bolts 29 and having a piston chamber 30 containing a piston 31. The outer end of the piston chamber 30 is closed by a head 32 having a cavity 33 in its inner surface which opens directly into the piston chamber 30 but is of smaller diameter than the piston chamber to provide a seat 34 for the piston 31 on the inner surface of the head. A supply port 35 in the head 32 affords communication between the cavity 33 and a conduit 36 leading from a source of pressure fluid supply, as for instance a storage receiver (not shown).

Suitable controlling devices (not shown) may be interposed in the conduit 36 to automatically introduce pressure fluid into the cavity 33 for actuating the piston 31 and thus, through suitable devices to be hereinafter described, a valve 37 which controls the aperture 24.

The valve 37, constructed in accordance with the practice of the invention, and which may serve the function of a clearance valve, comprises a sleeve or cylinder having a coniform surface 38 at one end to seat against a corresponding surface 39 in the aperture 24 for sealing the compression chamber at that point. The valve 37 is disposed slidably on a guide member 40 carried by the plate 26 and terminating adjacent the aperture 24.

The lower portion of the guide member 40 is in the form of a hollow plug 41 which is connected to the plate 26 by ribs 42. The ribs define guide slots 43 for a plate 44 secured to the outer end of the valve 37 by bolts 45. On the lower side of the plate 44 is a boss 46 which extends into a spring 47 bearing against an end wall 48 of the plug 41 to cushion the closing movement of the valve and to open the valve.

Preferably, a spring 49 is seated on the opposite surface of the plate 44 and acts against the plate 26, as through a spring seat 50 inserted in the end of the spring 49. In the spring seat 50 is a bore 51 to receive a stem 52 of a rod 53 carried by the piston 31. The stem 52 extends slidably thorugh the plate 44 and at its juncture with the rod 53 is a shoulder 55 to engage the spring seat 50 for transmitting the movement of the piston 31 to and through the spring 49 to the valve 37 for closing it.

The piston rod 53 extends through the plate 26, and packing material 56 in the plate 26 prevents leakage of fluid through the plate. The packing material may be suitably compressed by a gland 57 in the plate 26 and a nut 58 threaded into the inner end wall 59 of the piston chamber 30.

To the end that the tension of the springs 47 and 49 may be conveniently controlled from the exterior of the valve assembly and also that the valve 37 may be manually controlled a rod 60 is threaded into the head 32 in axial alignment with the piston 31 and has a hand wheel 61 whereby it may be manipulated. Thus, whenever it is desired to reduce the lifting or opening movement of the valve or to effect manual closing of the valve the rod 60 may be threaded inwardly to act as an abutment for the piston at points below the seat 34. The valve 37 may be completely closed and held in that position, as for instance when starting the compressor against an empty storage system and in which case the pressure fluid required for actuating the piston 31 would be lacking. After the pressure fluid in the storage system reaches that value at which, upon its admission into the cavity 33, it will predominate over the spring 47 the rod 60 may be threaded out of the path of the piston 31 and the action of the valve 37 may thereafter be controlled by pressure fluid, as is the normal mode of operation.

As will be readily understood, the valve 37 is supported in the open position by the spring 47 and upon admission of pressure fluid into the cavity 33 the piston is actuated thereby in the direction of the valve. In structures employing two springs, such as those designated 47 and 49 and in which case the piston rod 53 does not act directly against the plate 44, this movement of the piston is transmitted through the spring seat 50 and the spring 49 to the valve 37 which will then be moved to its seat against the opposing or cushioning force exerted by the spring 47.

After the valve 37 contacts with its seat 39 continued downward movement of the piston 31 will further compress the spring 49, thus providing a yieldable pressure for holding the valve 37 on its seat while at the same time avoiding rigid contact between the valve actuator and the valve and possible injury to the latter.

I claim:

1. A valve assembly comprising a guide member, a valve slidable on the guide member, pressure actuated means for moving the valve in one direction, a rod carried by the pressure actuated means and extending loosely into the valve, a spring acting against the rod and the valve to cushion the thrust of the pressure actuated means, and a spring in the guide member acting against the valve for moving the valve in the opposite direction.

2. A valve assembly comprising a plate, a guide member on one side of the plate, a valve slidable on the guide member, pressure actuated means on the opposite side of the plate for moving the valve in one direction, a rod carried by the pressure actuated means extending slidably through the plate and loosely into the valve, a spring acting against the rod and the valve to cushion the thrust of the pressure actuated means, and a spring in the guide member acting against the valve for moving the valve in the opposite direction.

3. A valve assembly comprising a plate, a guide member on one side of the plate, a valve slidable on the guide member, pressure actuated means on the opposite side of the plate for moving the valve in one direction, a rod carried by the pressure actuated means extending slidably through the plate and loosely into the valve, a spring acting against the rod and the valve to cushion the thrust of the pressure actuated means, a spring in the guide member acting against the valve for moving the valve in the opposite direction, and packing material in the plate to prevent leakage of pressure fluid along the rod.

CHARLES S. BAKER.